(12) United States Patent
Dean

(10) Patent No.: US 7,237,704 B2
(45) Date of Patent: Jul. 3, 2007

(54) BICYCLE CARRIER

(75) Inventor: Gregory A. Dean, McKinleyville, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 11/053,180

(22) Filed: Feb. 7, 2005

(65) Prior Publication Data

US 2005/0205627 A1 Sep. 22, 2005

Related U.S. Application Data

(63) Continuation of application No. 10/321,299, filed on Dec. 16, 2002, now Pat. No. 6,851,590, which is a continuation of application No. 09/585,723, filed on May 31, 2000, now Pat. No. 6,494,351.

(51) Int. Cl.
B60R 9/048 (2006.01)

(52) U.S. Cl. ........................ 224/324; 224/924

(58) Field of Classification Search ................ 224/324, 224/924, 315, 322
See application file for complete search history.

(56) References Cited

U.S. PATENT DOCUMENTS

| | | | |
|---|---|---|---|
| 3,828,993 A | 8/1974 | Carter | |
| 3,848,784 A | 11/1974 | Shimano et al. | |
| 4,629,104 A | 12/1986 | Jacquet | |
| 4,842,148 A | 6/1989 | Bowman | |
| 5,042,705 A | 8/1991 | Johansson | |
| 5,203,484 A | 4/1993 | Englander | |
| 5,275,319 A | 1/1994 | Ruana | |
| 5,362,173 A | 11/1994 | Ng | |
| 5,377,886 A | 1/1995 | Sickler | |
| 5,419,479 A | 5/1995 | Evels et al. | |
| 5,492,258 A | 2/1996 | Brunner | |
| 5,511,894 A | 4/1996 | Ng | |
| 5,598,959 A | 2/1997 | Lorensen et al. | |
| 5,730,343 A | 3/1998 | Settelmayer | |
| 5,762,248 A | 6/1998 | Englander et al. | |
| 5,862,964 A | 1/1999 | Moliner | |
| 5,875,947 A | 3/1999 | Noel et al. | |
| 5,924,614 A | 7/1999 | Kuntze et al. | |
| 6,062,450 A * | 5/2000 | Noel et al. .................. 224/315 |
| 6,167,735 B1 | 1/2001 | Brown | |
| 6,283,310 B1 * | 9/2001 | Dean et al. .................. 211/20 |
| 6,425,509 B1 * | 7/2002 | Dean et al. ................. 224/324 |

(Continued)

FOREIGN PATENT DOCUMENTS

DE  3912692  4/1989

(Continued)

Primary Examiner—Nathan J. Newhouse
Assistant Examiner—Justin M. Larson
(74) Attorney, Agent, or Firm—Kolisch Hartwell, P.C.

(57) ABSTRACT

A sports equipment carrier for a vehicle including a rack structure adapted to be mounted to a vehicle and an equipment securing portion. The equipment securing portion includes a clamping mechanism and an adjustment member, where the clamping mechanism includes a housing and is operable between open and closed configurations. Operation of the clamping mechanism shifts the adjustment member into and at least partially out of the housing so that the adjustment member is accessible to a user in the open configuration and inaccessible to a user in the closed configuration.

9 Claims, 8 Drawing Sheets

U.S. PATENT DOCUMENTS 6,494,351 B1  12/2002  Dean
6,851,590 B2   2/2005  Dean

FOREIGN PATENT DOCUMENTS

| | | |
|---|---|---|
| FR | 2251187 | 6/1975 |
| FR | 2420454 | 10/1979 |
| FR | 2428545 | 1/1980 |
| GB | 2303344 | 2/1997 |
| JP | 10-138847 | 5/1998 |
| SE | WO98/10959 | 3/1998 |

* cited by examiner

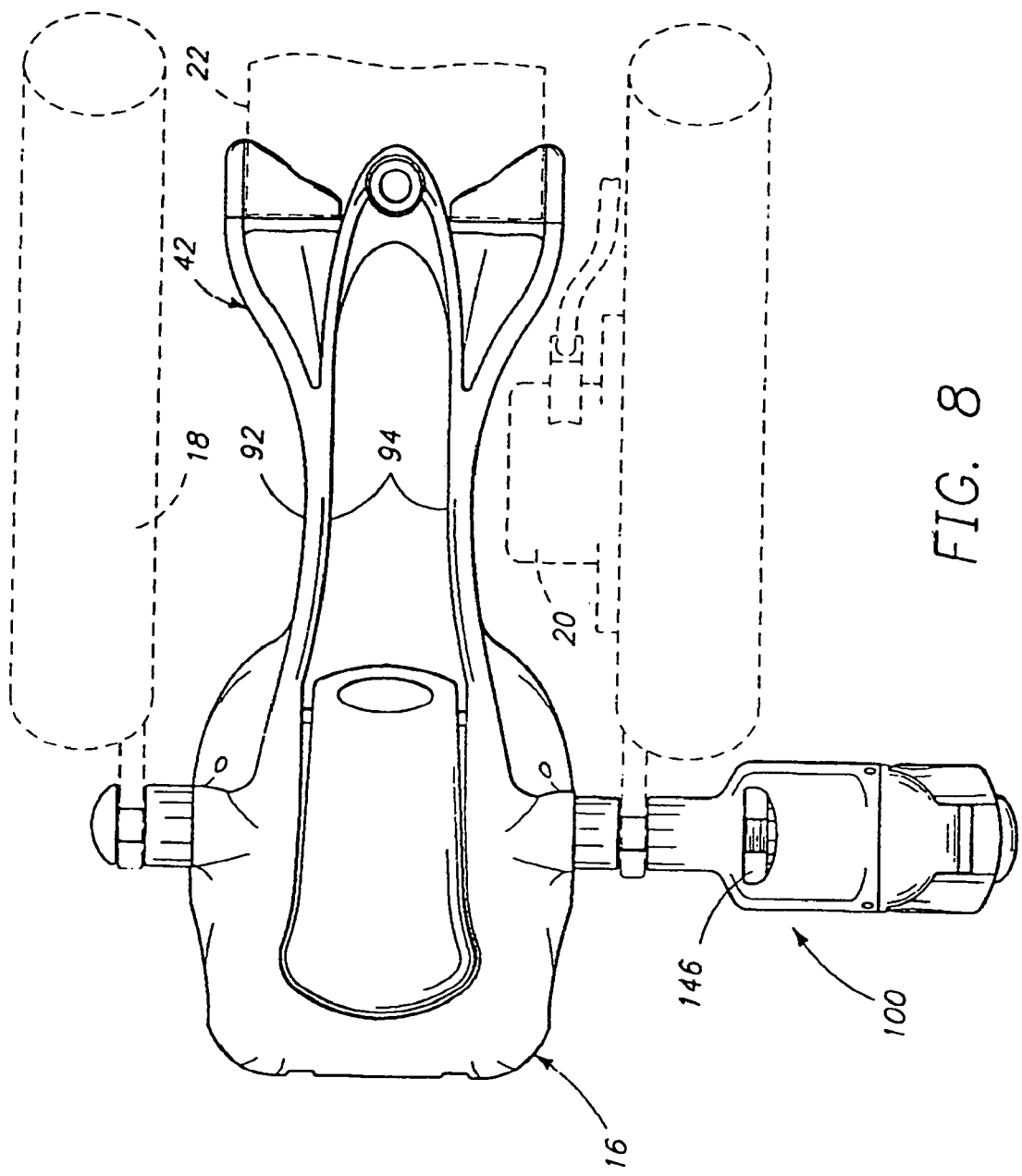
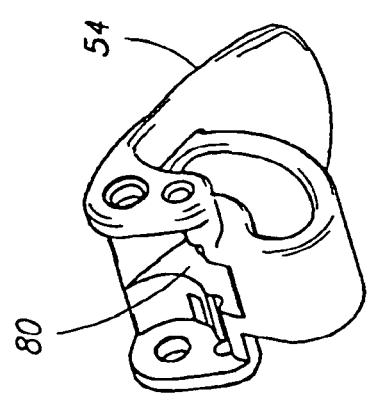
FIG. 7
FIG. 8

BICYCLE CARRIER

CROSS-REFERENCE TO RELATED APPLICATION

This application is a continuation of U.S. patent application Ser. No. 10/321,299 filed Dec. 16, 2002 now U.S. Pat. No. 6,851,590 which is a continuation application of Ser. No. 09/585,723 filed May 31, 2000, now U.S. Pat. No. 6,494,351, and are hereby incorporated by reference.

FIELD OF THE INVENTION

The present invention relates to devices for securing bicycles and more particularly to a bicycle carrier for use on vehicles.

BACKGROUND OF THE INVENTION

Bicycles are often transported on vehicles. Numerous racks and devices have been devised to secure bicycles to vehicles during transport. One particularly common bicycle carrier utilizes a fork block mounted to a rack structure. The fork block has a skewer that clamps the front forks of a bicycle to secure the bicycle to the rack. The clamping pressure of the skewer on the forks is sufficient to stabilize the bicycle against tipping during travel. Typically, a wheel tray extends back from the fork block to support the rear wheel.

Fork block-type bicycle carriers present a number of design challenges. First, the fork block/skewer must grip the forks of the bicycle firmly enough to provide the needed stability. At the same time, it should be easy to secure the bicycle to or release it from the fork block, as well as easy to adjust to fit various bikes. In addition, the carrier should provide some way of securing the bicycle against theft when it is left unattended. More recently, bicycles have begun to incorporate front disk brakes. The disk brakes require calipers mounted to the front forks and such calipers often will not fit over the wheel tray on existing designs.

BRIEF DESCRIPTION OF THE FIGURES

FIG. 7 is an isometric view of the backside of a handle forming part of the fork block of FIG. 2.

FIG. 8 is a top view of the fork block of FIG. 2.

DETAILED DESCRIPTION

Figure 1:
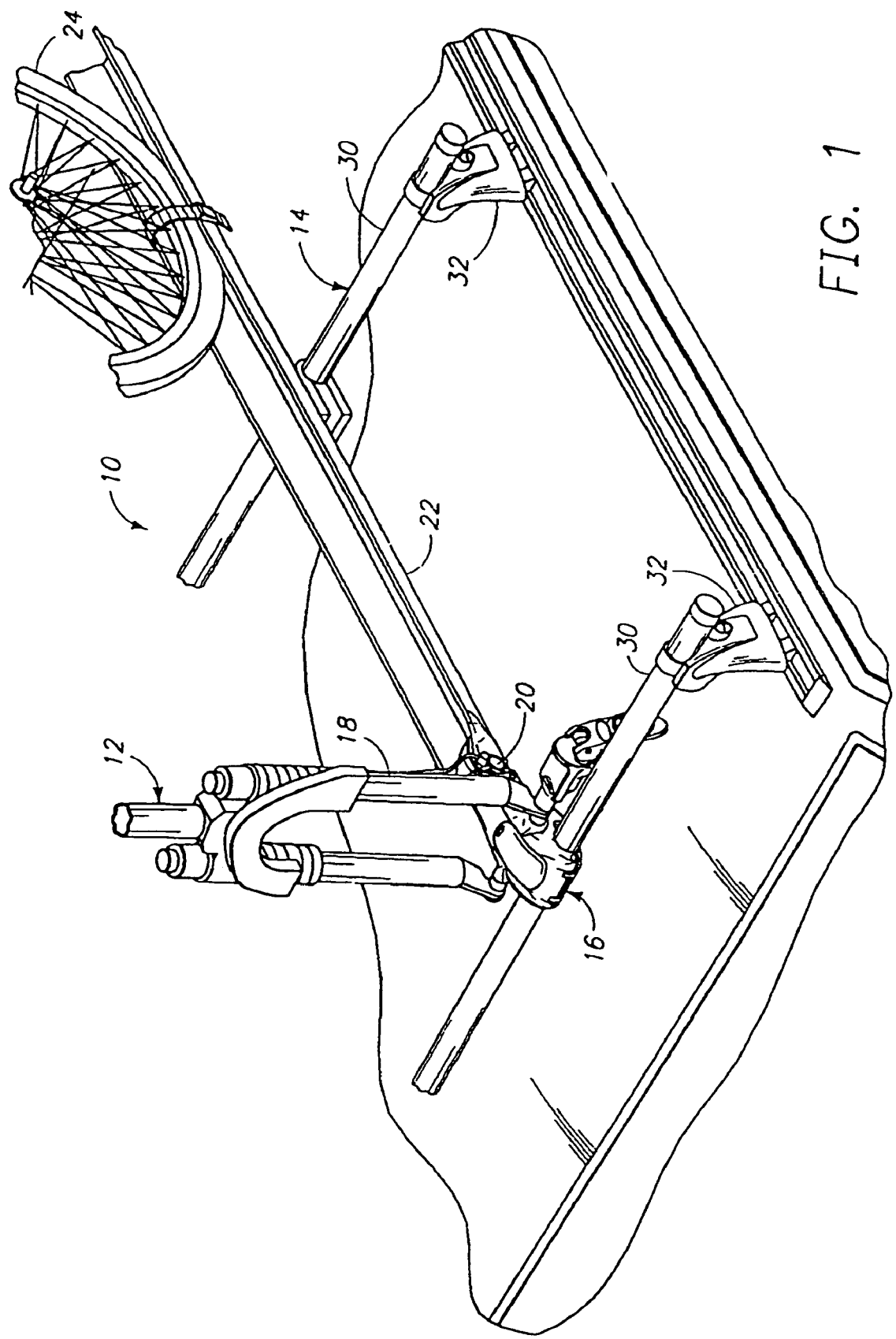
FIG. 1 is an isometric view of a bicycle carrier constructed according to the present invention.

A sport equipment carrier in the form of a bicycle carrier according to the present invention is shown generally at 10 in FIG. 1. Carrier 10 is adapted to receive and secure a bicycle 12. The carrier includes a rack portion 14 adapted to be mounted to a vehicle. Typical racks are mounted on the roof or rear of a vehicle. The carrier also includes an equipment securing portion in the form of a fork block 16 adapted to secure forks 18 of bicycle 12. Brake calipers 20 are mounted to forks 18. A wheel tray 22 extends back from the fork block to receive and stabilize rear tire 24 of the bicycle.

Rack portion 14, shown mounted to the roof of a vehicle, includes crossbars 30, which extend across the roof and are typically either round or rectangular in cross section. The crossbars are secured to the vehicle by towers 32 that may secure to the gutters at the edge of the roof or an original equipment rack. Alternatively, the rack portion may be part of a hitch-mounted rack or other type of rack.

Figure 2:
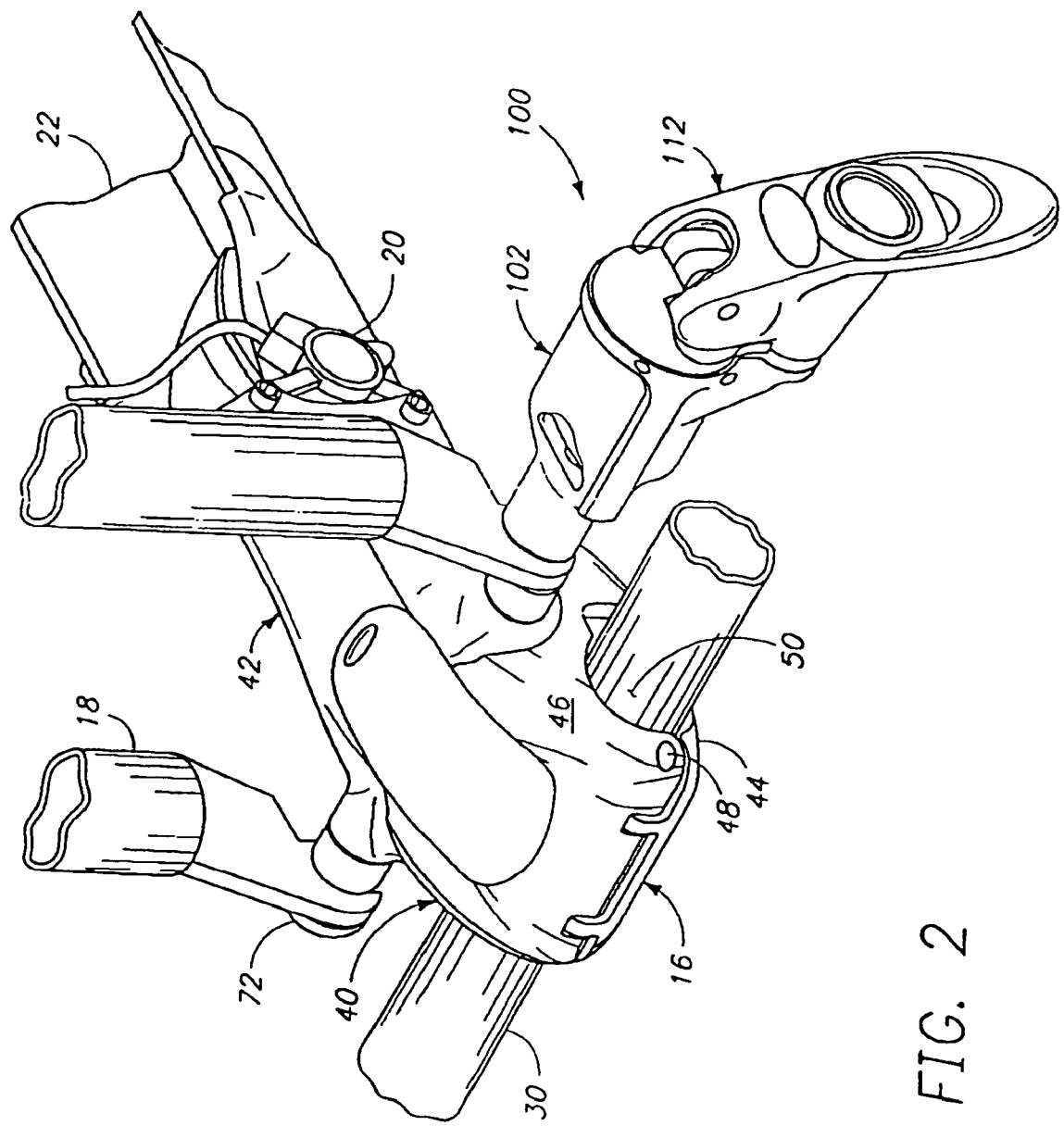
FIG. 2 is an isometric view of a fork block portion of the carrier of FIG. 1.
Figure 3:
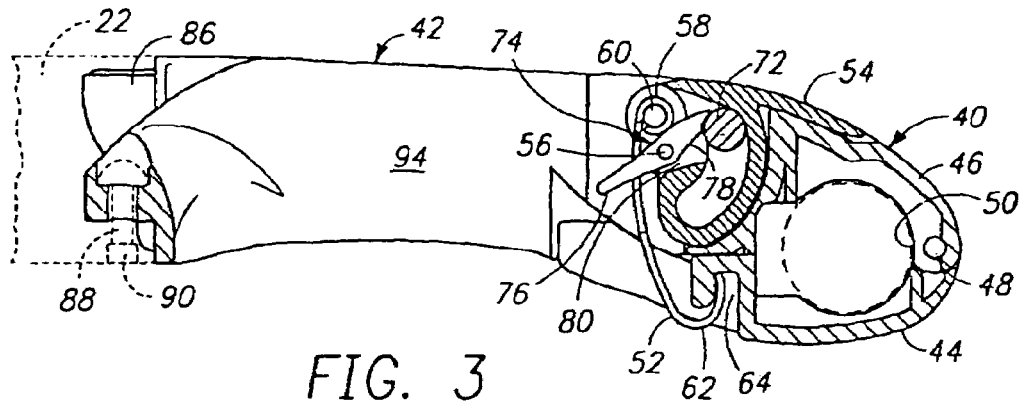
FIG. 3 is a cross-sectional view through the fork block of FIG. 2 in a closed configuration.
Figure 4:
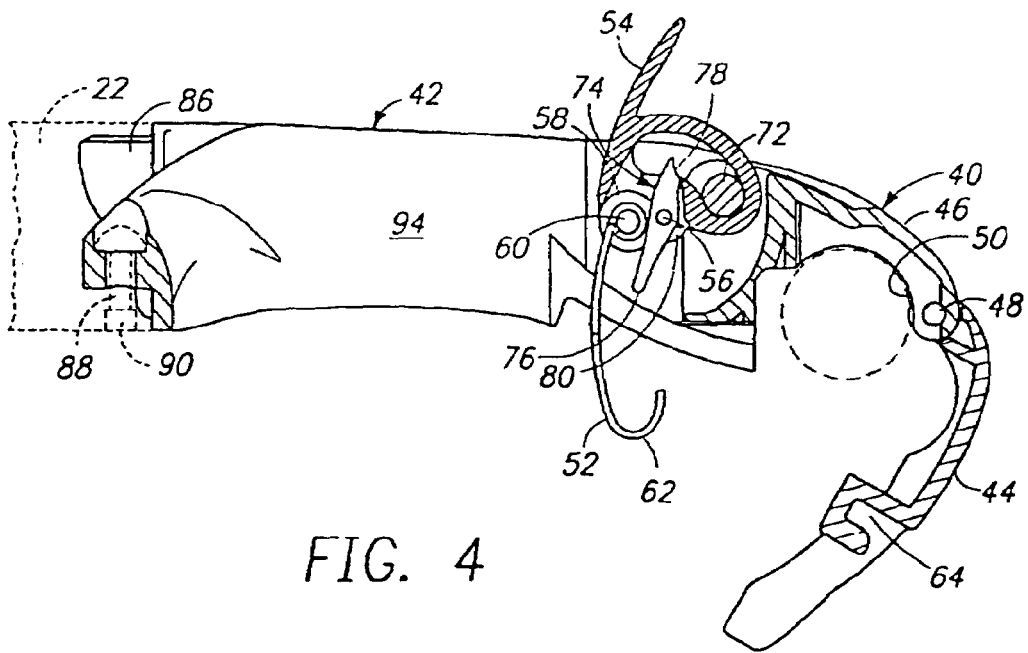
FIG. 4 is a cross-sectional view through the fork block of FIG. 2 in an open configuration.
Figure 5:
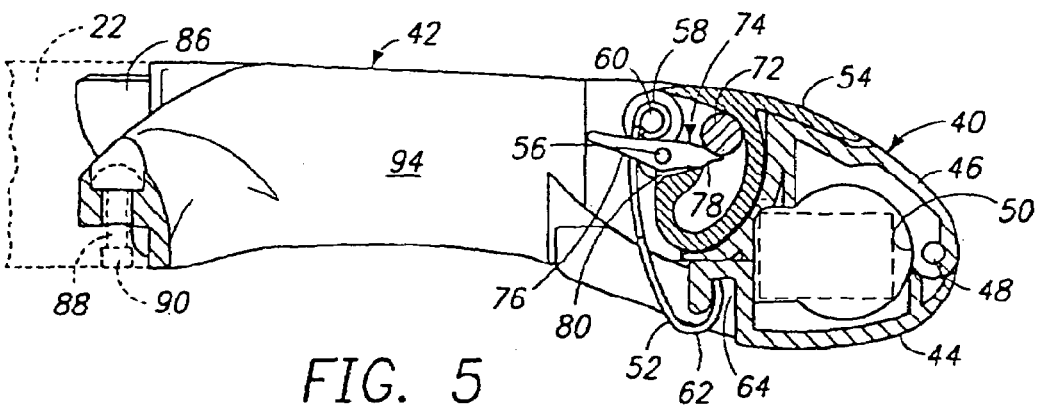
FIG. 5 is a cross-sectional view through the fork block of FIG. 2 in a locked configuration.
Figure 6:
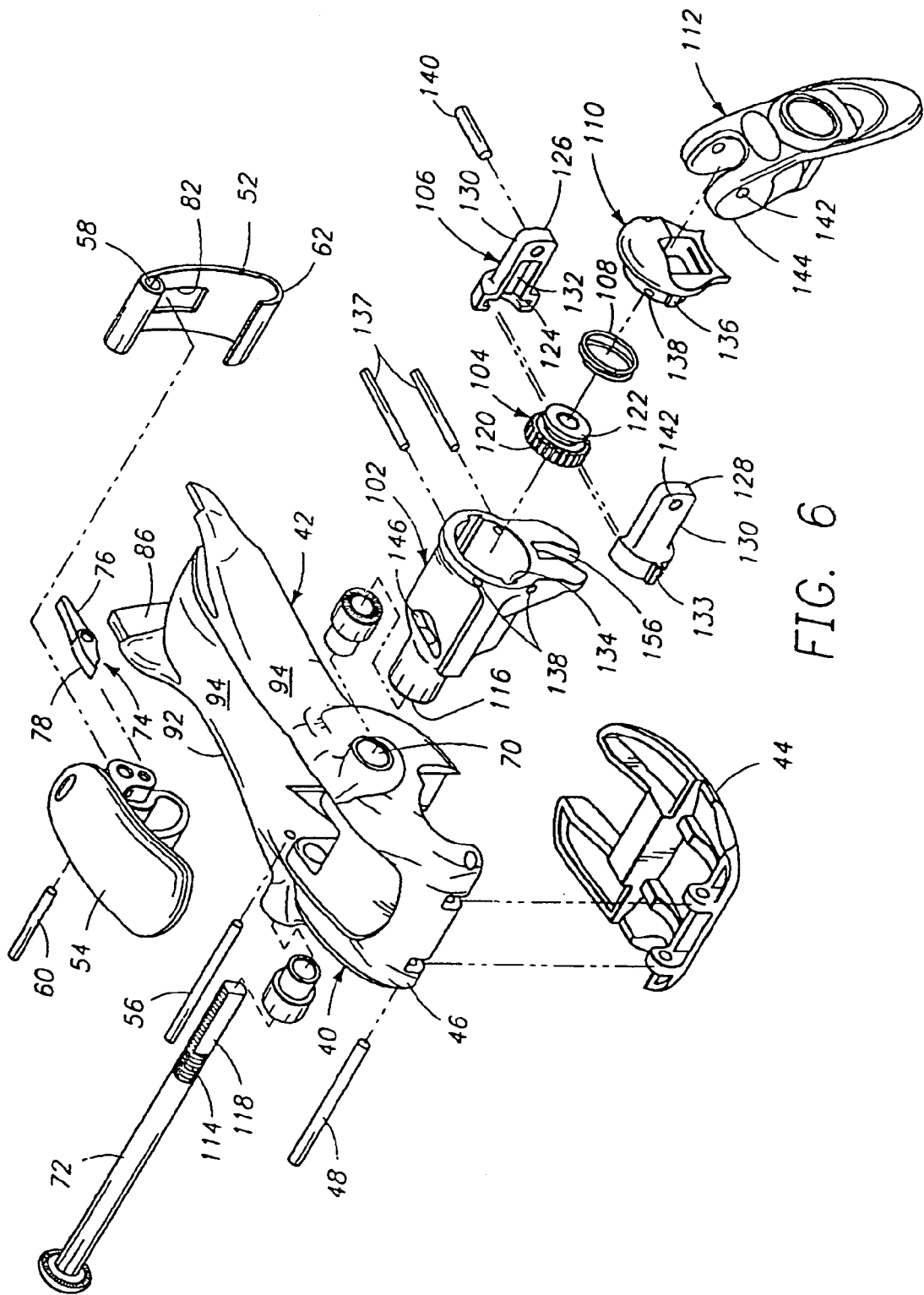
FIG. 6 is an exploded isometric view of the fork block of FIG. 2.

As shown in FIG. 2, fork block 16 includes a head portion 40 and an extension portion 42. Head portion 40 has a generally clamshell like mounting mechanism to selectively mount to crossbar 30. In particular, the head portion includes a lower jaw 44 pivotally connected to a fixed upper jaw 46 by a hinge pin 48. See FIGS. 3–6. The jaws define an opening 50 adapted to receive either a round or rectangular crossbar. It should be noted that the opening is shaped to grip the round bar as close to the hinge point as possible to thereby maximize clamping force on the round bar.

Lower jaw 44 is selectively secured by a catch 52 controlled by a handle 54. Handle 54 is pivotally mounted to head portion 40 at a pivot pin 56. The catch includes an upper hoop 58 that fits around a pin 60 carried by handle 54. The catch also includes a lower hook 62 that fits into a recess 64 formed in the free end of the lower jaw.

As the handle is raised to the open position, the catch is lowered sufficiently to allow the hook to be removed from the recess, releasing the lower jaw. To secure the jaw, the hook is placed in the recess and the handle is depressed. This brings the catch up and closes the jaw. The hook has sufficient curvature to provide some tension on the lower jaw in the closed position. The arrangement of couplings between the handle, catch and lower jaw creates an over-center geometry when the handle is in the closed position so that the handle tends to remain closed unless manually opened.

Head portion 40 includes a passage 70 configured to receive a skewer bolt 72. As will be described below, the skewer bolt is removable and serves to clamp the forks to the head portion. A locking mechanism interacts with the skewer bolt to selectively permit or prevent the opening of the lower jaw. The locking mechanism includes a toggle member 74 pivotally mounted on pivot pin 56. The toggle member includes a lever end 76 and an interference end 78 that projects through slots 80, 82 formed in the handle and catch into passage 70. See FIG. 7. Prior to installation of the skewer bolt, the lever can be pushed down to place the interference end above the skewer bolt or raised to place the interference end below the skewer bolt. Once the skewer bolt is installed, the toggle member cannot be transitioned between the upper and lower positions.

When the toggle member is in the lower or released configuration, the handle can be operated normally to clamp or release a crossbar. However, when the toggle member is in the upper or locked configuration, it blocks movement of the handle and therefore release of the crossbar. More specifically, in the locked configuration, the upper surface of the interference end rides against the lower surface of the skewer, while the lower surface is located against the bottom of slot 80. In order to rotate the handle, the bottom of the slot must rotate upward, which cannot happen while the toggle is under the skewer bolt.

By using the locking mechanism, a user can select at the time they install the skewer bolt whether or not they want the fork block to be releasable on the crossbar with the skewer locked. By engaging the locking mechanism, additional security against theft of the fork block and/or bicycle is obtained. However, by unlocking the mechanism, it is easier to adjust the location of the fork blocks on the crossbars to accommodate various bicycles or combinations of other equipment that might be mounted to the crossbars.

Extension portion 42 is generally elongate and extends back from head portion 40 to a wheel tray mount 86. The wheel tray is secured to the wheel tray mount by a bolt 88 and nut 90. The extension portion includes a waist region 92 between the head portion and wheel tray mount to provide increased clearance for calipers 20. See FIG. 8. Waist region 92 includes two elongate side members 94. It should be noted that waist region 92 is narrower than the wheel tray. In fork blocks where the wheel tray mounts to the fork block adjacent the skewer, the wheel tray interferes with the calipers. Typical wheel trays are formed as an aluminum extrusion and have a width that is dictated by the size of bicycle tires. Therefore, the wheel trays cannot easily be resized to provide the clearance offered by extension portion 42.

Skewer bolt 72 forms part of a skewer assembly 100. See FIG. 6. In addition to bolt 72, skewer assembly 100 includes a housing 102, an adjustment wheel 104, a transfer link 106, a spring 108, a cam plate 110 and a cam lever 112. The skewer bolt has a threaded end 114 that fits through a fork-clamping end 116 of housing 102. The threaded end of the skewer is formed with flats 118 on each side of the threaded region. Wheel 104 threads onto threaded end 114 to provide adjustment of the clamping pressure spacing on the skewer.

Wheel 104 includes a textured gripping perimeter 120 and a coupling flange 122. The coupling flange 122 is captured in recesses 124 formed in halves 126, 128 of transfer link 106. This arrangement allows the wheel to rotate within the link, but not move longitudinally relative to it. The flattened end of the skewer bolt rides in shank section 130 of the link in an elongate track 132 formed in each half of the link. The tracks have a flat bottom that interacts with the flats on the end of the skewer bolt to prevent the skewer bolt from rotating in the link, while still permitting the bolt to shift longitudinally for adjustment purposes. The link includes tabs 133 that slide in tracks 134 formed in housing 102.

Spring 108 fits over shank section 130 and biases against the bottom of cam plate 110. This tends to push the wheel away from the cam plate and therefore biases the skewer bolt to the open position. The cam plate includes ribs 136 that fit in tracks 134 to prevent the cam plate from rotating in the housing. The cam plate is secured to the housing by a pair of lock pins 137 pressed through holes 138 in the housing and cam plate.

Figure 9:
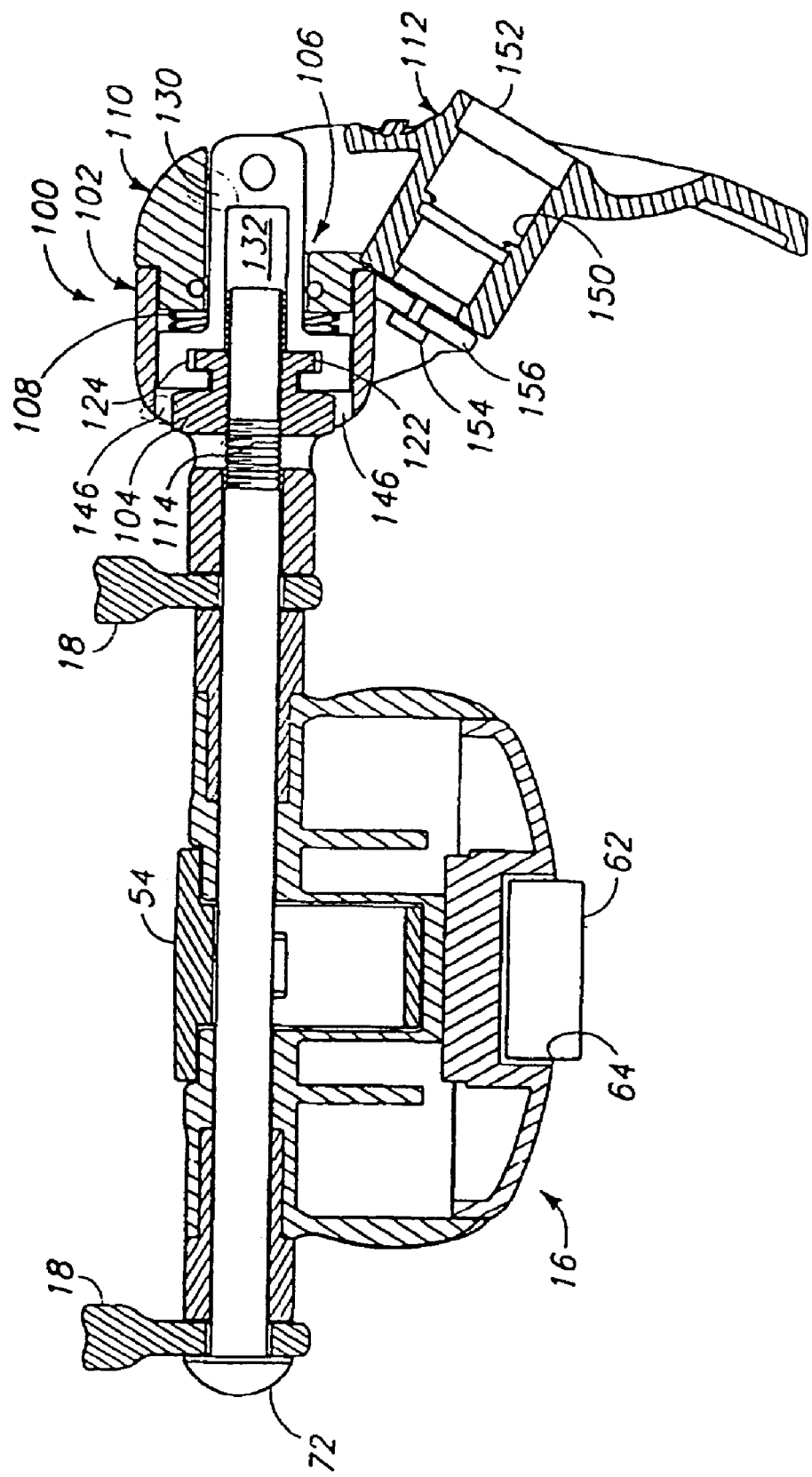
FIG. 9 is a cross-sectional view through the fork block and skewer assembly of FIG. 2 in a closed configuration.
Figure 10:
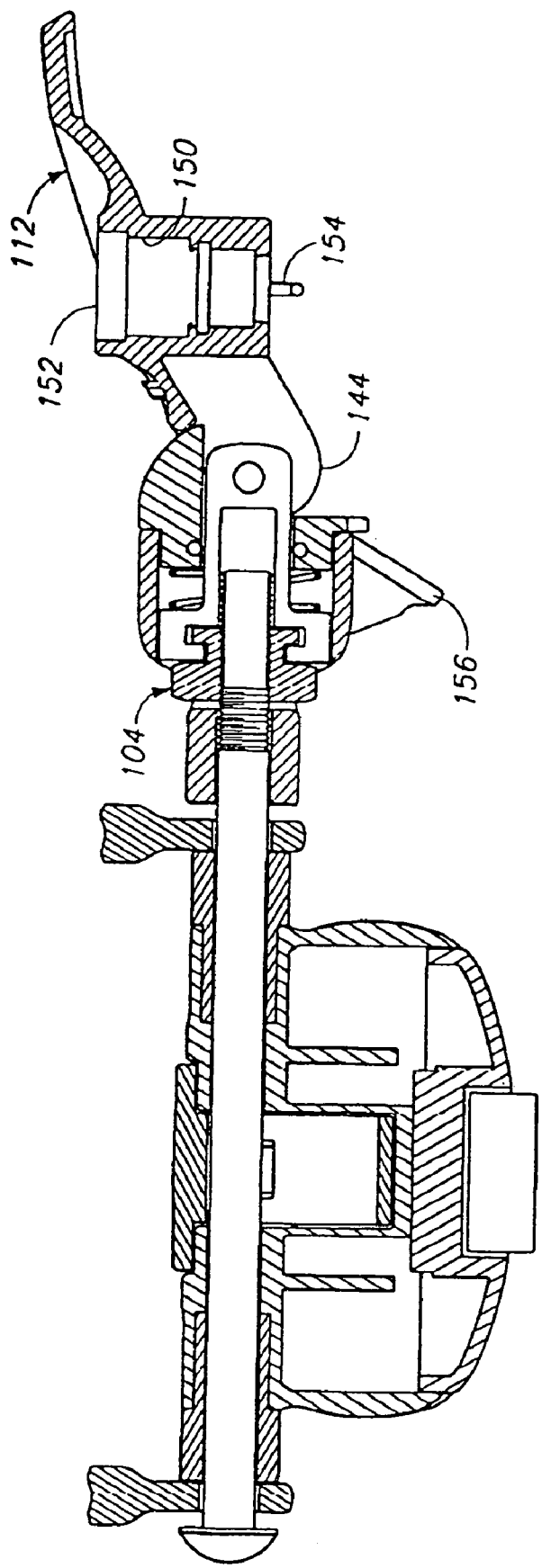
FIG. 10 is a cross-sectional view through the fork block and skewer assembly of FIG. 9 in an open configuration.

Cam lever 112 is attached to the end of the shank section of transfer link 106 via a pin 140 pressed through holes 142 formed in the shank and lever. The cam lever includes an arcuate cam surface 144 that rides against cam plate 110. As the lever is rotated, the cam surface is shaped to shift the link toward and away from the lever end of the skewer assembly to tighten or loosen the skewer assembly. See FIGS. 9 and 10. By turning the wheel until it completely unthreads from the skewer bolt, it is possible to remove the housing and associated components from the skewer bolt. This allows the skewer bolt to be removed from the fork block to in turn allow the toggle to be flipped between states.

Figure 11:
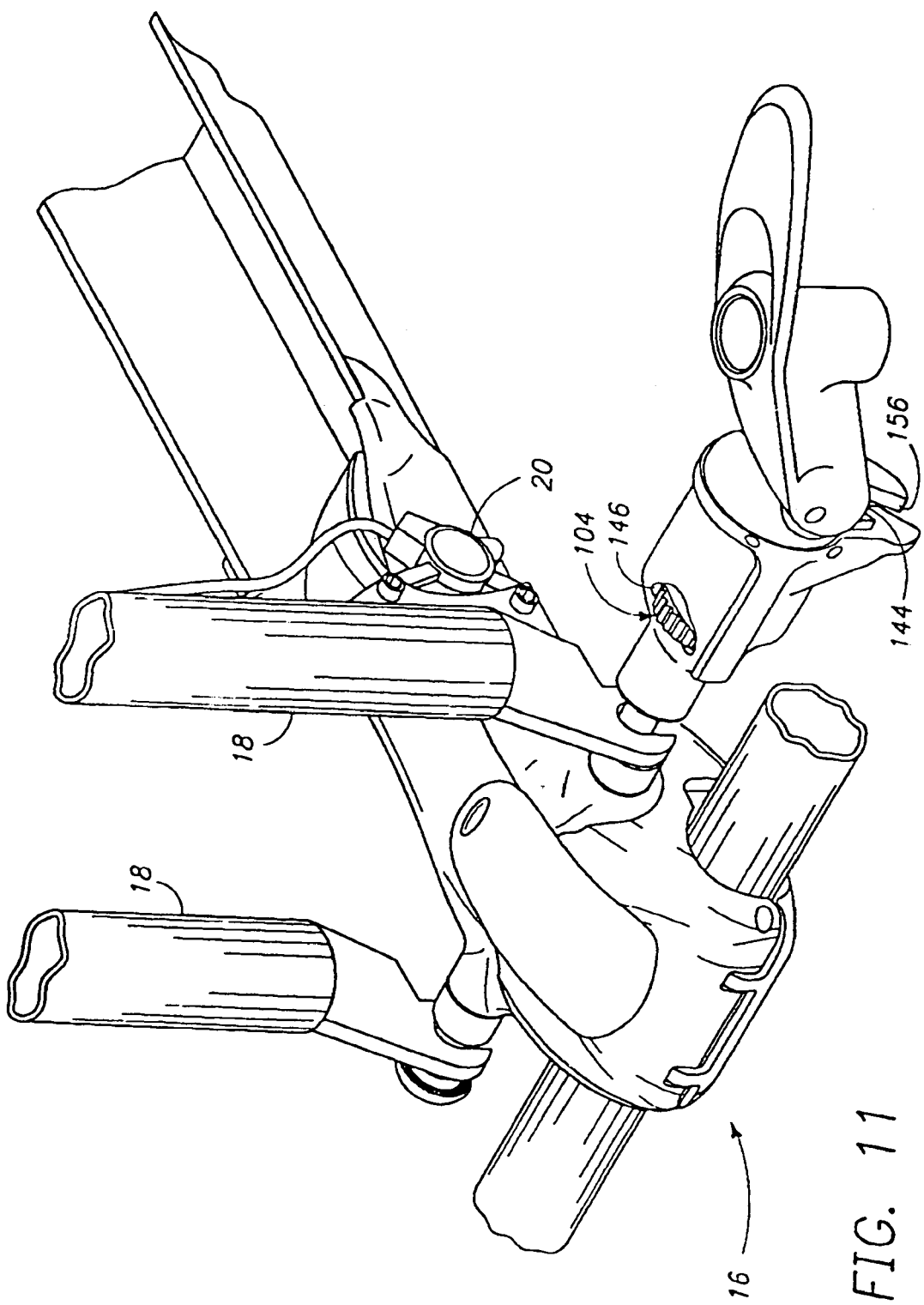
FIG. 11 is an isometric view of a fork block portion of the carrier of FIG. 2 with the skewer in an open configuration.

It should be noted that the housing including access openings 146 that provide access to the adjustment wheel when the lever is in the released position. See FIG. 11. Thus, when the lever is open, the user can rotate the wheel to select the correct spacing and tension to accommodate a particular set of bicycle forks. However, when the lever is closed, the wheel is retracted into the housing, preventing further adjustment. This is significant because it prevents a third party from using pliers or some other tool to loosen the skewer assembly so long as the lever remains in the closed position. So long as the toggle is placed in the locked configuration, the fork block also cannot be removed from the crossbars.

The lever includes a lock receptacle 150 configured to receive a lock body 152. The lock body includes a rotatable T-catch 154 that can be rotated with a key to either pass through or catch on a slot 156 formed in a lock shelf located on the side of the housing. When the catch is engaged to catch on the slot, the lever cannot be opened to release the skewer assembly, and, as long as the lever remains closed, the wheel is hidden and cannot be used to loosen the skewer. Moreover, because the wheel is mounted inside the housing and the skewer housing cannot rotate on the skewer bolt because of the interaction of the flats in the transfer link, it is not possible to use the skewer housing as a handle to loosen the skewer assembly.

The various structural members of the disclosed embodiment may be constructed of steel, stainless steel, nylon, aluminum or similar materials with sufficient structural strength to withstand the loads incurred in use.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to every one of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to some of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A bicycle carrier, comprising:
   first and second pairs of towers securing a pair of parallel crossbars on top of a vehicle,
   a fork block device,
   a wheel tray portion connected to the fork block device, the fork block device being configured to clamp around one of the crossbars, and
   a skewer assembly configured to secure forks of a bicycle to the fork block device, where the skewer assembly includes a skewer bolt passing through the fork block, an adjustment member permitting alteration of the skewer assembly to clamp various fork configurations, a cam lever moveable between open and closed positions, the adjustment member being hidden when the cam lever is in the closed position, and a lock for selectively retaining the lever in the closed position, wherein the adjustment member, cam lever, and lock are all located on the same side of the fork block so all manipulation to adjust, secure, and lock the front forks of a bicycle to the fork block may be performed from one side of the fork block.

2. The bicycle carrier of claim 1, wherein the skewer assembly includes a housing, the operation of the lever shifts the adjustment member into and at least partially out of the housing.

3. The bicycle carrier of claim 2, wherein the adjustment member is wheel-shaped and threads onto the skewer bolt.

4. The bicycle carrier of claim 1, wherein the fork block is selectively removable from the crossbar.

5. The bicycle carrier of claim 4, wherein the fork block includes a locking mechanism adjustable between first and second configurations, where in the first configuration the locking mechanism prevents the fork block from being removed from the rack structure and in the second configuration the locking mechanism allows the fork block to be removed from the crossbar.

6. The bicycle carrier of claim 5, wherein the locking mechanism is configured so that it can only be transitioned between the first and second configurations when the skewer assembly is removed from the bicycle securing portion.

7. The bicycle carrier of claim 1, where the fork block includes an elongate extension portion extending between the skewer assembly and a wheel tray mount configured to receive an end of the wheel tray.

8. The bicycle carrier of claim 1, where the fork block includes a moveable jaw pivotally connected to a fixed jaw at a hinge point, the jaws defining an opening therebetween adapted to receive a crossbar, where the opening is shaped to receive and clamp on either a round or a rectangular crossbar.

9. The bicycle carrier of claim 8, wherein the opening is shaped to hold a round crossbar in a position with the center of the crossbar closer to the hinge point than where the opening holds a rectangular crossbar.

* * * * *